United States Patent
Tjaum

(10) Patent No.: US 10,967,759 B2
(45) Date of Patent: Apr. 6, 2021

(54) MOTOR VEHICLE

(71) Applicant: Bayerische Motoren Werke Aktiengesellschaft, Munich (DE)

(72) Inventor: Hakon Gabriel Tjaum, Neusaess (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/383,898

(22) Filed: Apr. 15, 2019

(65) Prior Publication Data

US 2019/0241095 A1 Aug. 8, 2019

Related U.S. Application Data

(63) Continuation of application No. PCT/EP2017/075807, filed on Oct. 10, 2017.

(30) Foreign Application Priority Data

Oct. 20, 2016 (DE) .................... 10 2016 220 650.8

(51) Int. Cl.
*B60N 2/02* (2006.01)
*B60N 2/90* (2018.01)
(Continued)

(52) U.S. Cl.
CPC ............. *B60N 2/0244* (2013.01); *B60N 2/02* (2013.01); *B60N 2/0224* (2013.01); *B60N 2/20* (2013.01);
(Continued)

(58) Field of Classification Search
CPC ........ B60N 2/0244; B60N 2/99; B60N 2/914; B60N 2/929; B60N 2/02; B60N 2/0224;
(Continued)

(56) References Cited

U.S. PATENT DOCUMENTS 3,623,768 A * 11/1971 Capener ................ B60R 21/207
297/330
6,037,731 A 3/2000 Fruehauf et al.
(Continued)

FOREIGN PATENT DOCUMENTS

DE 36 13 830 A1 10/1987
DE 198 23 058 A1 12/1999
(Continued)

OTHER PUBLICATIONS

International Search Report (PCT/ISA/210) issued in PCT Application No. PCT/EP2017/075807 dated Feb. 2, 2018 with English translation (four (4) pages).
(Continued)

*Primary Examiner* — Philip F Gabler
(74) *Attorney, Agent, or Firm* — Crowell & Moring LLP

(57) ABSTRACT

A motor vehicle including at least one individual seat is provided. The individual seat includes a seat part and a backrest. The seat part has a seat-part main shell and seat-part side shells arranged thereon on respective sides. The backrest has a backrest main shell and backrest side shells arranged thereon on respective sides. A rail system is provided, which moves the respective seat-part side shell and/or the respective backrest side shell in a desired or specified position by way of actuators.

11 Claims, 2 Drawing Sheets

(51) Int. Cl.
*B60N 2/20* (2006.01)
*B60N 2/22* (2006.01)
*B60N 2/64* (2006.01)

(52) U.S. Cl.
CPC .............. *B60N 2/22* (2013.01); *B60N 2/643* (2013.01); *B60N 2/914* (2018.02); *B60N 2/929* (2018.02); *B60N 2/99* (2018.02); *B60N 2002/026* (2013.01); *B60N 2002/0212* (2013.01); *B60N 2002/0216* (2013.01); *B60N 2002/0256* (2013.01); *B60N 2002/0288* (2013.01); *B60N 2002/2204* (2013.01); *B60N 2205/30* (2013.01)

(58) Field of Classification Search
CPC . B60N 2/20; B60N 2/22; B60N 2/643; B60N 2002/0212; B60N 2002/0216; B60N 2002/0256; B60N 2002/026; B60N 2002/0288; B60N 2002/2204; B60N 2205/30

See application file for complete search history.

(56) References Cited

U.S. PATENT DOCUMENTS

| | | | | |
|---|---|---|---|---|
| 8,820,830 | B2* | 9/2014 | Lich | B60N 2/0276 |
| | | | | 297/216.13 |
| 8,985,622 | B1* | 3/2015 | Cannon | B60R 21/231 |
| | | | | 280/730.2 |
| 9,827,876 | B2* | 11/2017 | Madaras | B60N 2/0276 |
| 10,457,181 | B2* | 10/2019 | Stevens | B60N 2/0232 |
| 10,513,206 | B2* | 12/2019 | Spahn | B60R 21/2338 |
| 10,632,952 | B2* | 4/2020 | Markusic | B60R 21/207 |
| 2003/0107231 | A1 | 6/2003 | Oh et al. | |
| 2007/0057551 | A1* | 3/2007 | Lachenmann | B60N 2/99 |
| | | | | 297/284.9 |
| 2011/0254330 | A1 | 10/2011 | Lich et al. | |
| 2016/0082915 | A1* | 3/2016 | Madaras | B60R 21/207 |
| | | | | 297/216.2 |
| 2016/0121759 | A1* | 5/2016 | Lee | B60N 2/0232 |
| | | | | 297/217.2 |

FOREIGN PATENT DOCUMENTS

| | | |
|---|---|---|
| DE | 10 2004 020 116 A1 | 11/2005 |
| DE | 10 2005 051 422 A1 | 5/2007 |
| DE | 10 2007 003 284 A1 | 7/2008 |
| DE | 10 2007 040 229 A1 | 2/2009 |
| DE | 10 2008 043 617 A1 | 5/2010 |
| GB | 2 463 366 A | 3/2010 |

OTHER PUBLICATIONS

German-language Written Opinion (PCT/ISA/237) issued in PCT Application No. PCT/EP2017/075807 dated Feb. 2, 2018 (five (5) pages).

German-language Search Report issued in counterpart German Application No. 102016220650.8 dated Aug. 29, 2017 with partial English translation (14 pages).

Chinese Office Action issued in Chinese Application No. 201780057176.2 dated Oct. 21, 2020 (Seven (7) pages).

* cited by examiner

MOTOR VEHICLE

CROSS REFERENCE TO RELATED APPLICATIONS

This application is a continuation of PCT International Application No. PCT/EP2017/075807, filed Oct. 10, 2017, which claims priority under 35 U.S.C. § 119 from German Patent Application No. 10 2016 220 650.8, filed Oct. 20, 2016, the entire disclosures of which are herein expressly incorporated by reference.

BACKGROUND AND SUMMARY OF THE INVENTION

The invention relates to a motor vehicle.

DE 102007003284 A1 discloses a motor vehicle which has a vehicle seat with an inflatable air cushion of which the hollow volume can be altered in an active fashion. The hollow volume of the cushion element with the inflatable air cushion is connected, via a line system, to a store which supplies a filling agent for filling the hollow volume. Also provided is at least one actuator for filling and emptying the hollow volume of the cushion element. The cushion element is, for example, a vehicle-door-mounted lateral guidance cushion.

The actuator is coupled to a motor-vehicle door via a coupling element, and therefore actuation of the motor-vehicle door activates the actuator so as to alter the hollow volume of the lateral guidance cushion of the seat in an active fashion such that the filling agent is released from the lateral seat guidance cushion in the vicinity of the door and entry into the motor vehicle is thus facilitated. When the motor-vehicle door is closed, the lateral seat guidance cushion in the vicinity of the door is filled.

One object of the invention is to create a motor vehicle having at least one seat of which the shape can be altered in a straightforward manner.

This and other objects are achieved by a motor vehicle including at least one individual seat including a seat part and a backrest in accordance with embodiments of the invention.

The seat part advantageously has a main seat-part shell and a lateral seat-part shell arranged on each side thereof. In addition, or as an alternative, the backrest has a main backrest shell and a lateral backrest shell arranged on each side thereof. A rail system is also provided and, via actuators it adjusts the respective lateral seat-part shell and/or the respective lateral backrest shell into a desired or predetermined position.

In an advantageous embodiment, for the purpose of adjusting the lateral seat-part shells and/or the lateral backrest shells, the rail system is arranged on the rear side of the backrest and/or the underside of the main seat-part shell.

If the lateral seat-part shells and/or the lateral backrest shells are arranged in an adjustable manner, via the rail system, on the rear side of the backrest and/or the underside of the main seat-part shell.

The backrest can advantageously be pivoted in terms of inclination in relation to the seat part.

In an advantageous embodiment for facilitating entry into and/or exit from the motor vehicle, when the motor vehicle is at a standstill and the vehicle door is open, the lateral seat-part shell and/or lateral backrest shell adjacent to the vehicle door is in a state in which it has been adjusted out of a retracted position into an extended position.

The seat part and/or the backrest advantageously have/has a lateral support, which is arranged at the side and has a respective cavity with a volume which can be filled with, or emptied of, a filling agent via an actuator.

In an advantageous embodiment, when the motor vehicle is at a standstill, the respective lateral support which is formed in the seat part and/or on the backrest and is adjacent to the open vehicle door is in an emptied state, and this therefore gives rise to a planar seat-part surface and/or a planar backrest surface for the purpose of facilitating entry and/or exit.

The shape and width of the seat-part surface and/or of the backrest surface are advantageously set in dependence on the driving speed and/or on the acceleration of the motor vehicle as it starts up and/or the braking and/or on the selected mode of operation of an automatic transmission, in the case of a motor vehicle being controlled by a driver and/or on the given driving conditions, in the case of highly automated driving.

In an advantageous embodiment, the width and shape of the seat part and of the backrest are adjusted via the lateral seat-part shells and/or via the possibly present lateral seat-part supports, which can be altered in terms of shape and size, and/or via the lateral backrest shells and/or via the possibly present lateral backrest supports, which can be altered in terms of shape and size.

In the case of the seat according to an embodiment of the invention, the width and the shape of the seat-part surface and/or of the backrest surface can be straightforwardly altered, and adapted to the driving situation, on account of predetermined conditions.

The backrest advantageously has a headrest at its upper end.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
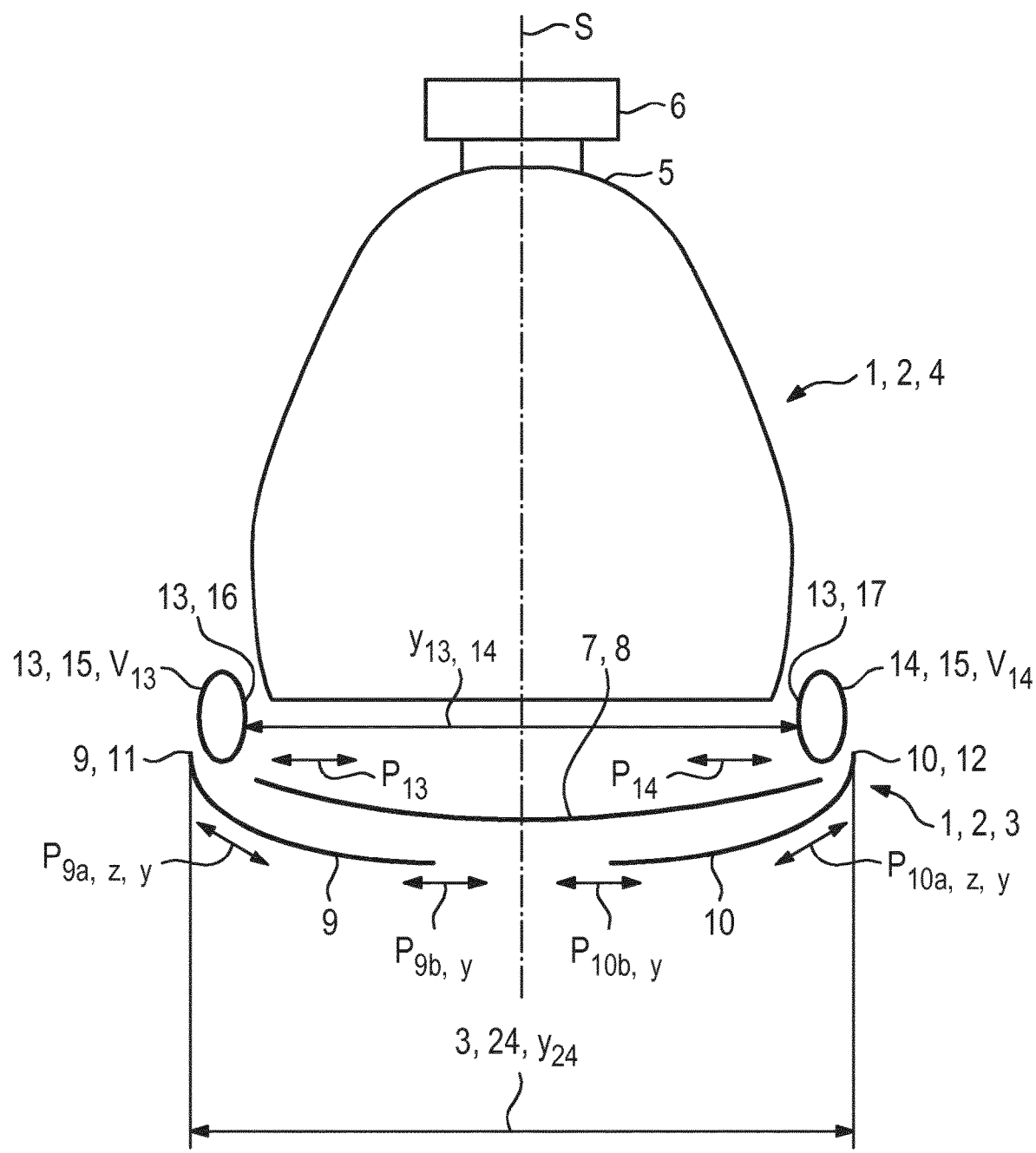
FIG. 1 is a partial illustration of individual seat of which the seat part has a main seat-part shell and two lateral seat-part shells which are arranged beneath the main part, can be adjusted in the transverse direction of the seat and can be moved in a reversible manner, via devices, from an inner position, adjacent to the seat center, into an outwardly adjustable outer position.
Figure 1:
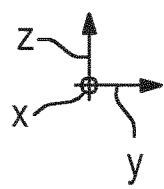

FIG. 1 shows a basic illustration of an individual seat 2 of a motor vehicle 1 (not illustrated in detail). The individual seat 2 has a seat part 3 and a backrest 4. A headrest 6, which is for example at least height-adjustable, is arranged at an upper end 5 of the backrest 4.

In FIG. 1, the cushions have been left off from the seat part 3 and the backrest 4. A main seat-part shell 7 is illustrated in FIG. 1. At a distance from an underside 8 of the main seat-part shell 7, two lateral seat-part shells 9, 10 can be adjusted, symmetrically to a vertically running line of symmetry S, in the transverse direction y of the vehicle and in the vertical direction z of the vehicle for displacement via actuators (not illustrated) in the direction of the illustrated arrows $P_{9a,z,y}$, $P_{10a,z,y}$, $P_{9b,y}$ and $P_{10b,y}$. The two lateral seat-part shells 9, 10 can adjust the width $y_{24}$ of a surface 24 of the seat part 3, said width extending in the transverse direction y of the vehicle.

Schematically illustrated, fillable lateral guidance cushions or lateral supports 13, 14 are arranged at the lateral ends 11, 12 of the lateral seat-part shells 9, 10. As is already known, for example, from DE 102007003284 A1, the two fillable lateral supports 13, 14 can be filled with a filling agent 15, for example air, via a control device for the purpose of altering the lateral-support volume $V_{13}$, $V_{14}$.

The lateral supports 13, 14 are filled in order to reduce or to increase a distance, in the transverse direction $y_{13,14}$ of the vehicle, between the respective inner surface 16, 17 of the respective lateral supports 13, 14. The reduction or the increase in the distance in the transverse direction $y_{13,14}$ of the vehicle is illustrated symbolically by arrows $P_{13}$ and $P_{14}$.

Figure 2:
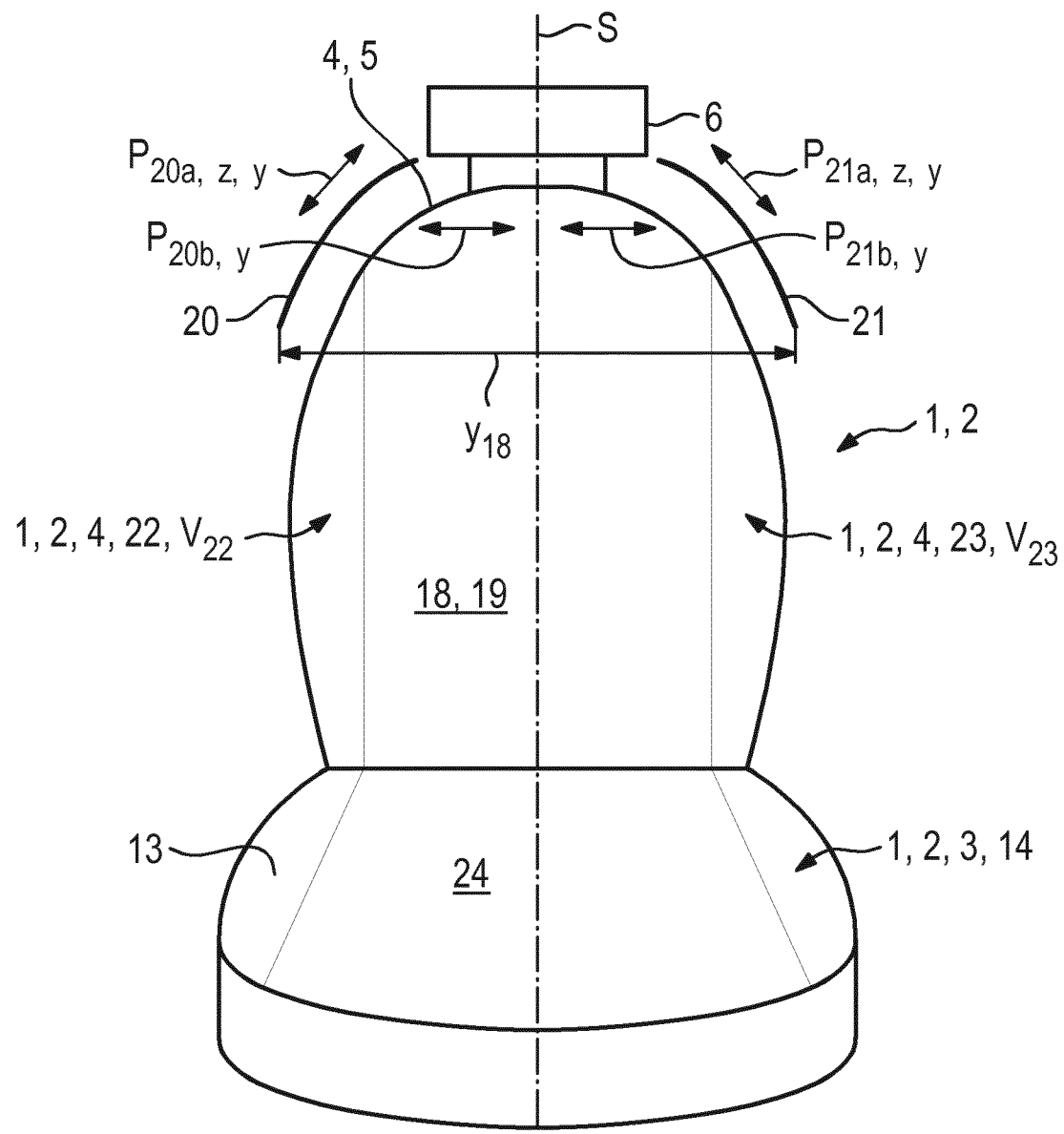
FIG. 2 is a schematic diagram of the individual seat shown in FIG. 1, wherein the individual seat has a backrest made up of a main backrest shell and two lateral backrest shells which are arranged on each side and can be adjusted in the transverse direction of the seat.

FIG. 2 shows the individual seat 2 which is illustrated schematically in FIG. 1. The backrest 4 has a main backrest shell 19. Two adjustable lateral backrest shells 20, 21 are provided at the upper end 5 of the backrest 4, at a symmetrical spacing apart from the vertically running line of symmetry S.

The lateral backrest shells 20, 21 can be adjusted, in accordance with the arrows $P_{20a,z,y}$, $P_{21a,z,y}$; $P_{20b,y}$ and $P_{21b,y}$, to the side in the transverse direction y of the vehicle and upwards in the vertical direction z of the vehicle in order to increase or reduce the width $y_{18}$ of the backrest surface 18.

In the embodiment shown in FIG. 2, the backrest has 2 lateral supports 22, 23. In a manner corresponding to the prior art known from DE 102007003284 A1, the lateral supports 22, 23 can have a cavity with a volume $V_{22}$, $V_{23}$, it being possible for said cavity to be filled with a filling agent, for example air. In a manner corresponding to DE 102007003284 A1, the cavity with the volume $V_{22}$, $V_{23}$ of the respective lateral support 22, 23 can be filled or emptied separately or jointly via an actuator, for example a compressor and a vacuum pump.

The actuators for displacing the lateral seat-part shells 9, 10 or the lateral backrest shells 20, 21 can have an electric, hydraulic and/or a pneumatic drive. The actuators are integrated firmly in the seat 2. In another embodiment, the lateral seat-part shells 9, 10 and/or the lateral backrest shells 20, 21 can be adjusted manually.

In another embodiment, a rail system is arranged on the rear side of the backrest 4 and/or on the underside 8 of the main seat-part shell 7. The lateral seat-part shells 9, 10 and/or the lateral backrest shells 20, 21 are displaceable, for example via the rail system, on the rear side of the backrest 4 and/or the underside 8 of the main seat-part shell 7.

The fillable lateral supports 13, 14 on the seat part and/or the fillable lateral supports 22, 23 assist the movements of the individual lateral seat-part shells 9, 10 and/or of the lateral backrest shells 20, 21.

In the embodiment shown, the main seat-part shell 7 is curved in the form of a circle. The two lateral seat-part shells 9, 10 can thus be adjusted along a movement axis in the transverse direction y of the vehicle in the vertical direction z of the vehicle.

The sliding-action actuating mechanism can be used to increase the seat-part surface 24 and/or the backrest surface 18 for example for entry purposes, and therefore entry into the motor vehicle 1 is facilitated.

For example, it is possible, prior to a person entering into the interior of the motor vehicle 1, for the filling agent 15 to be released from the respective lateral seat-part support 13, 14 or lateral backrest support 22, 23 in the vicinity of the door, and this therefore gives rise to a planar seat surface 24 and/or planar backrest surface 18.

The lateral seat-part shell 9, 10 and/or lateral backrest shell 20, 21 which is adjacent in the entry direction moves outward for the purpose of facilitating entry, in order likewise to increase the seat-part surface 24 and/or the backrest surface 18.

When the motor vehicle is being driven, the lateral supports 13, 14 on the seat part 3 and/or the lateral supports 22, 23 and/or on the backrest 4 are refilled, and therefore the distance between the respective adjacent lateral supports 13, 14 and/or lateral supports 22, 23 is reduced again and lateral guidance by the previously emptied lateral supports 13, 14 and/or by the previously emptied lateral support 22, 23 is re-established.

In addition, an actuating mechanism stored in the seat 2 moves the lateral seat-part shells 9, 10 and/or the lateral backrest shells 20, 21 such that for example, a previously set seat width $y_{24}$ on the seat part 3 and/or a seat width $y_{18}$ on the backrests 4 is automatically re-established.

Adjustment of the lateral seat-part shells 9, 10 and adjustment of the lateral backrest shells 20, 21 can be controlled separately or jointly in a coordinated manner. This means that it is possible, as a person is entering when the vehicle is at a standstill, for at least one side of the seat which is oriented in the direction of the door to be wide and flat, and this makes it easier for the person to take up position on the seat 2.

If the motor vehicle 1 is being driven, at least the respective emptied lateral support 13, 14 and/or 22, 23 is transferred into the original shape again by the filling agent 15, usually air or some other gas, present.

In another embodiment, in which the motor vehicle provides for highly automated driving or autonomous driving and the driver and also possibly other people in the motor vehicle 1 are located on an individual seat 2, there are at least two operating situations for the respective seat 2 in addition to the mode of operation for facilitating entry and exit.

In the case of highly automated driving or autonomous driving, it is possible, when the vehicle is in driving mode, for the seat 2 to have a wide seat-part surface 24 and a wide backrest surface 18 without lateral supports 13, 14 and/or 22, 23 being filled, i.e. this being a "relaxed" position.

For example, in the case of automatic transmission, it is possible to have a number of driving modes ranging from a sport mode, via a comfort mode, to an energy-saving mode. In accordance with these driving modes, which are mentioned by way of example, it is possible for the "driving" position to be adjusted automatically, in accordance with the selected transmission mode of operation, from a seat width with narrow or relatively narrow lateral guidance to relatively wide lateral guidance.

In a situation in which the person sitting on the seat 2 has to be strapped in and the person sitting on the seat 2 requires lateral guidance, for example when the vehicle is starting up or braking or accelerating, the seat 2 can be adjusted automatically from the "relaxed" position into a "driving" position in which the lateral seat-part shells 9, 10 and/or the lateral backrest shells 20, 21 are moved toward one another.

For particularly rapid driving, or driving over a twisting stretch of road, it is possible to set a particularly narrow seat position, or "sport" position, as a result of the lateral seat-part shells 9, 10 and/or of the lateral backrest shells 20, 21 being moved together and, in addition, as a result of the lateral supports 13, 14 on the seat part 3 and/or of the lateral supports 22, 23 on the backrest 4 being filled to the maximum extent.

It is also possible for seat-size adjustment to be used for different driving modes. In a "comfort mode" or in an energy-saving mode, e.g. when the speed of the motor vehicle 1 remains approximately constant, it is possible for example for the seat 2 to have a comfort setting with a wider seat-part surface 24 and/or a wider backrest surface 18, i.e. with lateral play in relation to the body of the person sitting on the seat 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle comprising:
   at least one individual seat, where the individual seat includes a seat part and a backrest, wherein
   the seat part includes a main seat part shell and a lateral seat part shell arranged on each side thereof, and/or the backrest includes a main backrest shell and a lateral backrest shell arranged on each side thereof,
   a rail system is provided and, via actuators, adjusts the respective lateral seat part shell and/or the respective lateral backrest shell,
   a width of a surface of the seat part is adjustable via the lateral seat part shells,
   a width of a surface of the backrest is adjustable via the lateral backrest shells, and
   when the motor vehicle is at a standstill and a vehicle door is open, the lateral seat part shell adjacent to the open vehicle door is in a state in which it has been adjusted out of a retracted position into an extended position such that the width of the surface of the seat part is increased.

2. The motor vehicle according to claim 1, wherein, for the purpose of adjusting the lateral seat part shells and/or the lateral backrest shells, the rail system is arranged on a rear side of the backrest and/or an underside of the main seat part shell.

3. The motor vehicle according to claim 2, wherein the backrest is pivotable in terms of inclination in relation to the seat part.

4. The motor vehicle according to claim 1, wherein the backrest is pivotable in terms of inclination in relation to the seat part.

5. The motor vehicle according to claim 4, wherein the seat part and/or the backrest have/has in each case a lateral support, which is arranged at a side and has a respective cavity with a volume which is fillable with, or emptied of, a filling agent via an actuator.

6. The motor vehicle according to claim 5, wherein, when the motor vehicle is at the standstill and the vehicle door is open, the respective lateral support which is formed in the seat part and/or on the backrest and is adjacent to the open vehicle door is empty of the filling agent, which gives rise to a planar surface of the seat part and/or a planar surface of the backrest.

7. The motor vehicle according to claim 4, wherein the backrest includes a headrest at its upper end.

8. The motor vehicle according to claim 1, wherein the seat part and/or the backrest have/has in each case a lateral support, which is arranged at a side and has a respective cavity with a volume which is fillable with, or emptied of, a filling agent via an actuator.

9. The motor vehicle according to claim 8, wherein, when the motor vehicle is at the standstill and the vehicle door is open, the respective lateral support which is formed in the seat part and/or on the backrest and is adjacent to the open vehicle door is empty of the filling agent, which gives rise to a planar surface of the seat part and/or a planar surface of the backrest.

10. The motor vehicle according to claim 1, wherein a shape and the width of the surface of the seat part and/or of the surface of the backrest are set in dependence on a driving speed and/or on an acceleration of the motor vehicle as it starts up and/or brakes and/or on a selected mode of operation.

11. The motor vehicle according to claim 1, wherein the backrest includes a headrest at its upper end.

* * * * *